United States Patent
Okumura et al.

(10) Patent No.: US 10,794,757 B2
(45) Date of Patent: Oct. 6, 2020

(54) NEAR-INFRARED SENSOR COVER

(71) Applicant: TOYODA GOSEI CO., LTD., Kiyosu-shi, Aichi-ken (JP)

(72) Inventors: Koji Okumura, Kiyosu (JP); Shintaro Okawa, Kiyosu (JP); Hiroaki Ando, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/353,405

(22) Filed: Mar. 14, 2019

(65) Prior Publication Data

US 2019/0293485 A1 Sep. 26, 2019

(30) Foreign Application Priority Data

Mar. 22, 2018 (JP) .................. 2018-054500

(51) Int. Cl.
*G01J 1/04* (2006.01)
(52) U.S. Cl.
CPC .................. *G01J 1/0488* (2013.01)
(58) Field of Classification Search
CPC .......... G01J 5/04; G01J 1/0488; G01J 5/0215
See application file for complete search history.

(56) References Cited

U.S. PATENT DOCUMENTS

2002/0041968 A1  4/2002  Sada et al.

FOREIGN PATENT DOCUMENTS

| JP | 2002-116318 A | 4/2002 |
| JP | 2004-198617 A | 7/2004 |
| JP | 2004-244516 A | 9/2004 |
| JP | 3760032 B2 | 1/2006 |
| JP | 2017175515 * | 9/2017 ............ G01S 13/86 |

OTHER PUBLICATIONS

Information Offer Form was filed by a third party on Aug. 10, 2020 in the corresponding JP patent application No. 2018-054500 (and English translation).

* cited by examiner

*Primary Examiner* — David P Porta
*Assistant Examiner* — Fani Boosalis
(74) *Attorney, Agent, or Firm* — Posz Law Group, PLC

(57) ABSTRACT

There is provided a near-infrared sensor cover to be applied to a near-infrared sensor including a transmitting unit that transmits near-infrared radiation to outside of a vehicle and a receiving unit that receives near-infrared radiation reaching and reflected by an object outside the vehicle, and to cover the transmitting unit and the receiving unit. The near-infrared sensor cover includes a luster layer formed by dispersing a filler in a coating film, the filler including a core and a shell that covers the core with a material having a refractive index different from that of the core. Light transmittance of near-infrared radiation in the near-infrared sensor cover is 60% or more.

4 Claims, 7 Drawing Sheets

NEAR-INFRARED SENSOR COVER

CROSS-REFERENCE TO RELATED APPLICATION

This application claims priority from Japanese Patent Application No. 2018-054500, filed on Mar. 22, 2018, the entire subject matter of which is incorporated herein by reference.

TECHNICAL FIELD

The present invention relates to a near-infrared sensor cover that covers a near-infrared transmitting unit and a near-infrared receiving unit of a near-infrared sensor.

BACKGROUND ART

In the field of vehicles, a technology has been developed to detect a distance from or a relative speed with respect to an object including a preceding vehicle, a pedestrian, and the like using a near-infrared sensor including a transmitting unit and a receiving unit. The detection is performed by transmitting near-infrared radiation from the transmitting unit to outside of a vehicle and receiving near-infrared radiation reaching and reflected by the object outside the vehicle by the receiving unit.

When the near-infrared sensor is attached to the vehicle in an exposed state, the transmitting unit and the receiving unit are directly visible from front of the vehicle. Therefore, appearance of the near-infrared sensor itself and the vehicle in a vicinity of the near-infrared sensor deteriorates.

Therefore, it is considered to cover the transmitting unit and the receiving unit with a near-infrared sensor cover. A cover formed of a transparent or translucent resin colored in black is used as the near-infrared sensor cover, so as to ensure optical characteristics of the cover which hardly transmits visible light and easily transmit near-infrared radiation.

When the near-infrared sensor cover is mounted on the vehicle, a design deteriorates if, for example, a color of the cover is different from that of a design component disposed in a vicinity of the mounting location. In view of this, there have been studied various near infrared sensor covers capable of improving the design by fitting the color with the design component (for example, see JP-A-2004-198617). However, a near-infrared sensor cover having both sufficient decorative properties and transparency of near-infrared radiation has not yet been obtained.

SUMMARY

Accordingly, an aspect of the present invention provides a near-infrared sensor cover capable of improving a design while ensuring a detection function of a near-infrared sensor.

According to an embodiment of the present invention, there is provided a near-infrared sensor cover to be applied to a near-infrared sensor including a transmitting unit configured to transmit near-infrared radiation to outside of a vehicle and a receiving unit configured to receive near-infrared radiation reaching and reflected by an object outside the vehicle, and to cover the transmitting unit and the receiving unit. The near-infrared sensor cover includes a luster layer formed by dispersing a filler in a coating film, the filler including a core and a shell that covers the core with a material having a refractive index different from that of the core. Light transmittance of near-infrared radiation in the near-infrared sensor cover is 60% or more.

According to the above configuration, when the near-infrared sensor cover is irradiated with light from a light source (such as a sun or a lamp) outside the vehicle, a part of the light is reflected on a surface of the shell in the luster layer. Another part of the light is refracted at the surface of the shell and enters the same shell, and is reflected on a boundary of the shell and the core and exits out of the shell. These two kinds of light enhance each other (interfere with each other) when phases thereof are aligned, and only light of a specific color is enhanced. Which color of light is enhanced depends on a thickness of the shell. Therefore, by adjusting the thickness of the shell, it is possible to enhance light of a specific color having a wavelength corresponding to the thickness. From outside of the vehicle, the reflected light appears to be lustered like a metal (with metallic luster) with a specific color.

Further, a color of light reflected and enhanced by the shell and the core may fit a color of a design component around the near-infrared sensor cover in the vehicle. Accordingly, unity of the near-infrared sensor cover with the design component is obtained, so that the design is improved.

When the design component has metallic luster, the metallic luster of the luster layer further increases the unity with the design component, thereby further improving the design. The near-infrared radiation transmitted from the transmitting unit of the near-infrared sensor penetrates through the near-infrared sensor cover. The near-infrared radiation, after reaching and being reflected by the object including a preceding vehicle, a pedestrian, and the like, penetrates through the near-infrared sensor cover again and is received by the receiving unit. The near-infrared sensor cover less likely to interfere with the transmission of the near-infrared radiation since the light transmittance of near-infrared radiation in the near-infrared sensor cover is 60% or more. Therefore, the near-infrared sensor functions properly to detect the distance and the relative speed between the vehicle and the object.

In the near-infrared sensor cover, the filler may be made of pearl mica in which the core is formed of aluminum oxide or titanium oxide and the shell is formed of tin oxide or zirconium oxide. Alternatively, the filler may also be made of a glass filler in which the core is formed of silicon dioxide and the shell is formed of titanium oxide.

The near-infrared sensor cover may further include a decorative layer including a coating film containing at least one of a pigment and a dye as a colorant.

According to this configuration, when the near-infrared sensor cover is irradiated with light from a light source outside the vehicle, a part of the light is reflected by the decorative layer. The color of light reflected and enhanced by the shell and the core in the luster layer and a color of light reflected by the decorative layer appear to be mixed from outside of the vehicle.

Therefore, color fitting is easier as compared with a case where a color of the near-infrared sensor cover fits the color of the design component around the near-infrared sensor cover in the vehicle only by means of the color of light reflected and enhanced by the shell and the core in the luster layer.

According to the above near-infrared sensor cover, it is possible to improve the design while ensuring the detection function of the near-infrared sensor.

DESCRIPTION OF EMBODIMENTS

First Embodiment

Hereinafter, a near-infrared sensor cover according to a first embodiment is described with reference to FIGS. 1 to 4.

In the following description, a forward direction of a vehicle is described as front, and a backward direction is described as rear. An upper-lower direction indicates an upper-lower direction of the vehicle, and a left-right direction, which is a vehicle width direction, coincides with a left-right direction of the vehicle during forward movement.

Figure 1:
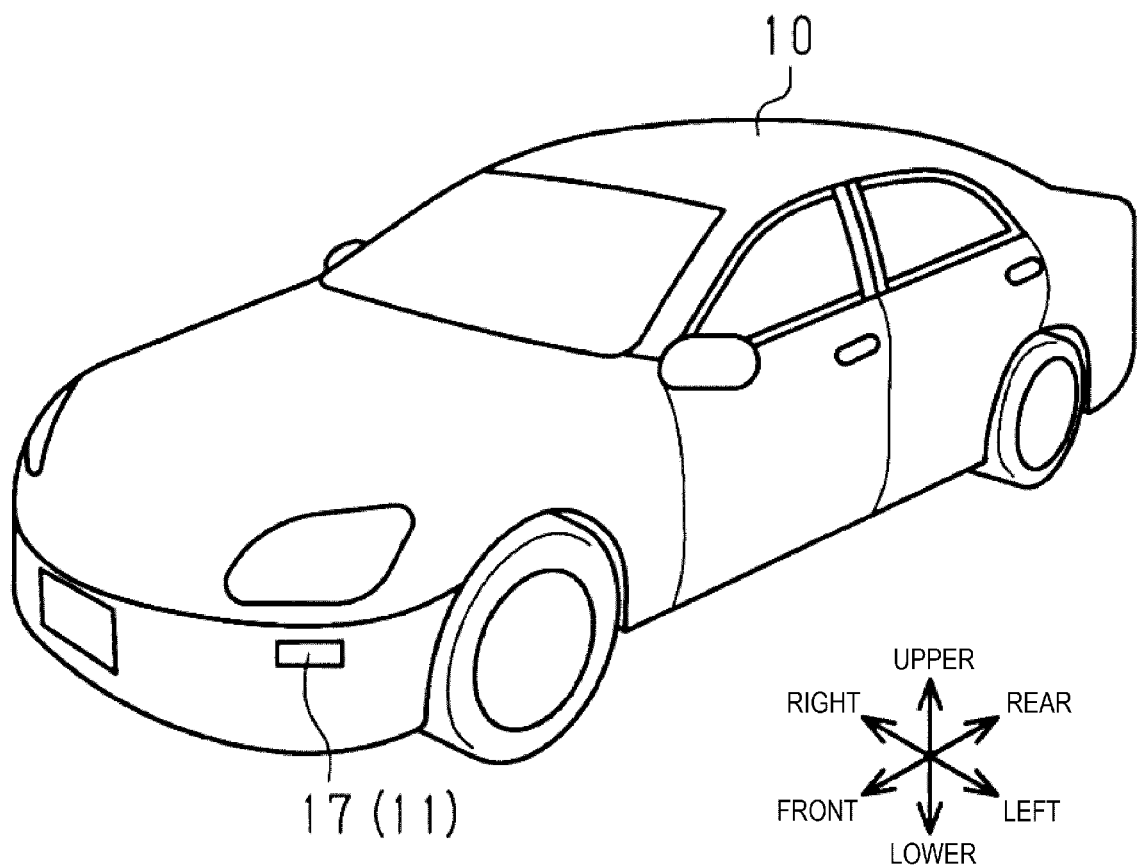
FIG. 1 is a perspective view of a vehicle to which a near-infrared sensor cover according a first embodiment is applied.
Figure 2:
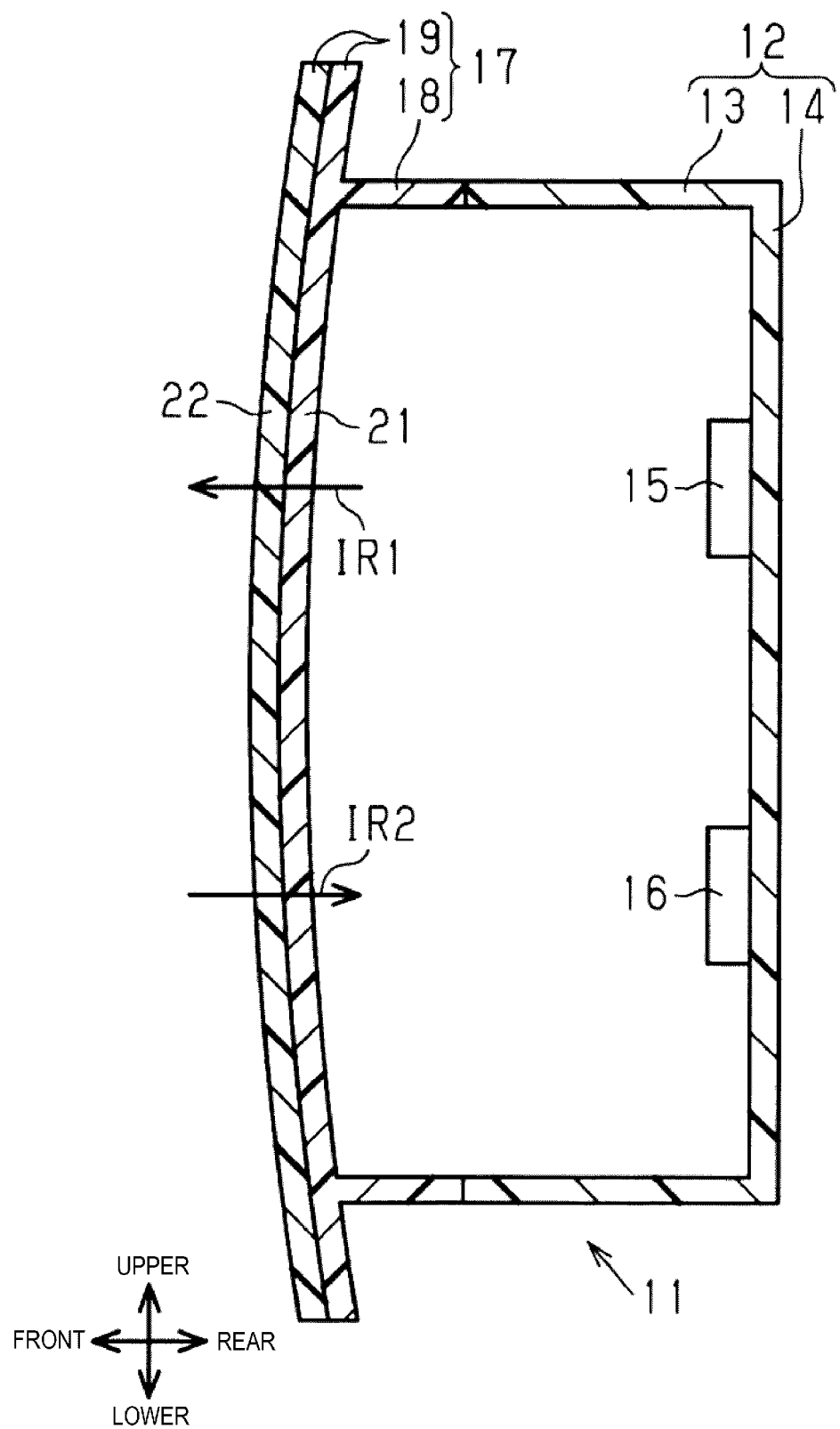
FIG. 2 is a side cross-sectional view illustrating a near-infrared sensor includes the near-infrared sensor cover according to the first embodiment.

As illustrated in FIGS. 1 and 2, near-infrared sensors 11 are attached to four corners (right front portion, left front portion, right rear portion, and left rear portion) of a vehicle 10 in a plan view. FIG. 1 illustrates only the near-infrared sensor 11 attached to the left front portion of the vehicle 10. The near-infrared sensors 11 in the four corners have the same configuration. Therefore, only the near-infrared sensor 11 attached to the left front portion of the vehicle 10 is described below, and descriptions of the other three near-infrared sensors 11 are omitted.

The near-infrared sensor 11, which is a component constituting a part of a near-infrared radar device, detects a distance from or a relative speed with respect to an object including a preceding vehicle, a pedestrian, and the like by transmitting near-infrared radiation IR1 toward front of the vehicle 10 and receiving near-infrared radiation IR2 reaching and reflected by the object outside the vehicle. The detection result is used for collision damage reduction control, erroneous start inhibition control, and the like.

Infrared radiation is a kind of electromagnetic waves, and has a wavelength longer than a wavelength of visible light (0.36 μm to 0.83 μm). The near-infrared radiation IR1, IR2 has a shortest wavelength (0.83 μm to 3 μm) in the infrared radiation.

There is a millimeter-wave radar device having a function similar to that of the near-infrared radar device. The millimeter-wave radar device irradiates millimeter waves toward outside of the vehicle 10 in a prescribed angle range and detects an inter-vehicle distance from or a relative speed with respect to a preceding vehicle from a time difference between transmitted waves and received waves, strength of the received waves, and the like.

The near-infrared sensor 11 in the near-infrared radar device irradiates the near-infrared radiation IR1 in an angle range wider than that in the millimeter wave radar device. Further, the near-infrared sensor 11 detects an object at a distance closer than that in the millimeter wave radar device.

A rear half portion of an outer shell of the near-infrared sensor 11 is constituted by a case 12, and a front half portion is constituted by a cover. The near-infrared sensor 11 is fixed to a body of the vehicle 10.

The case 12 includes a tubular peripheral wall portion 13 and a bottom wall portion 14 at a rear end portion of the peripheral wall portion 13, and has a bottomed tubular shape with a front side opened. The entire case 12 is formed of a resin material such as polybutylene terephthalate (PBT). A transmitting unit 15 that transmits the near-infrared radiation IR1 and a receiving unit 16 that receives the near-infrared radiation IR2 are attached to a front surface of the bottom wall portion 14.

The cover of the near-infrared sensor 11 is constituted by a near-infrared sensor cover 17. The near-infrared sensor cover 17 includes a tubular peripheral wall portion 18 and a plate-shaped cover main body portion 19 at a front end portion of the peripheral wall portion 18. The peripheral wall 18 of the near-infrared sensor cover 17 is adjacent to a front side of the peripheral wall 13 of the case 12. A periphery of the cover main body portion 19 extends outward from the peripheral wall portion 18. The cover main body portion 19 is curved so as to bulge forward. Most of the cover main body portion 19 is located in front of the bottom wall portion 14 and covers the transmitting unit 15 and the receiving unit 16 from front.

Figure 3:
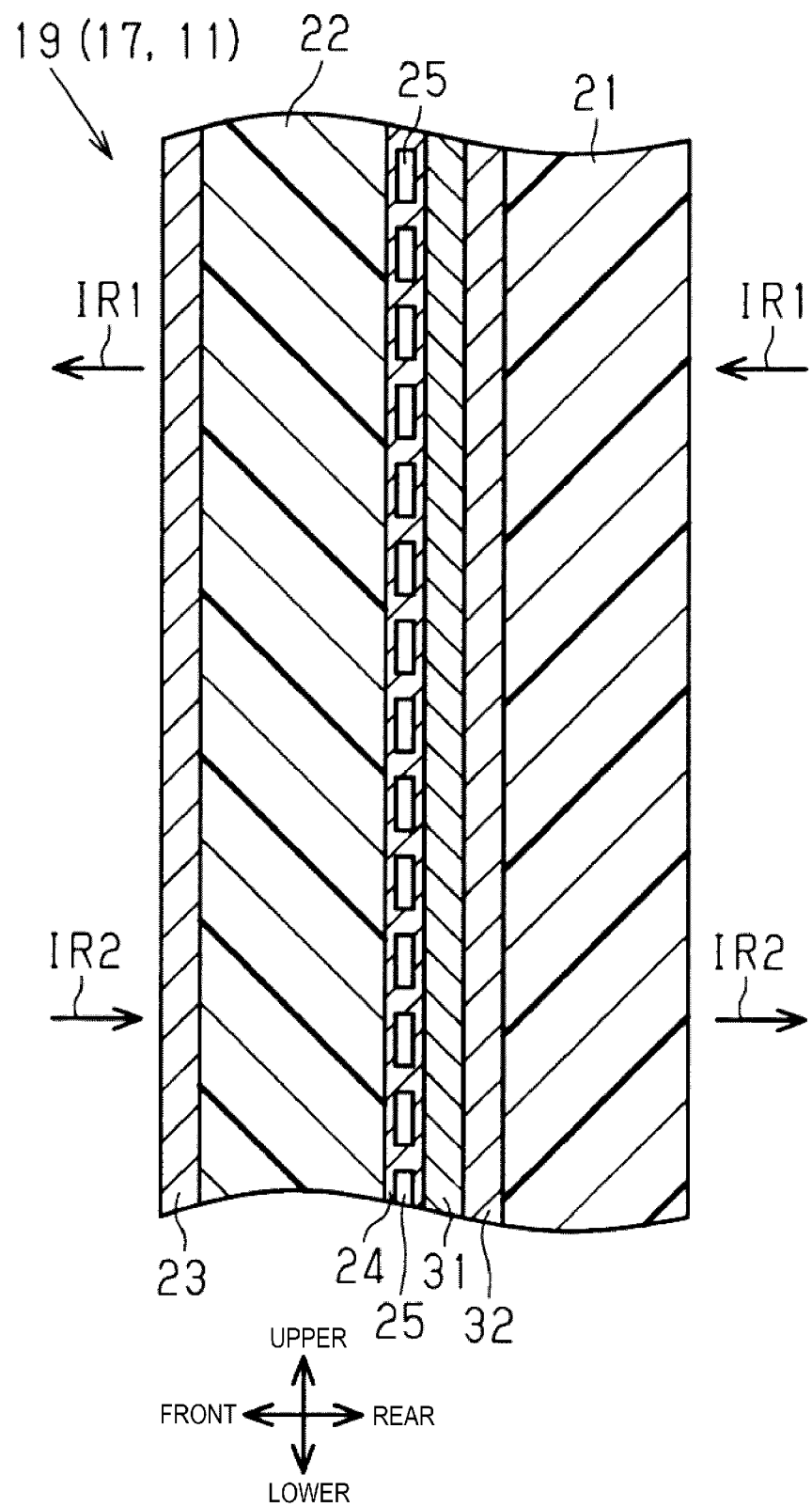
FIG. 3 is a partial enlarged side cross-sectional view of a cover main body portion of the near-infrared sensor cover according to the first embodiment.

As illustrated in FIGS. 2 and 3, a thickness direction of the cover main body portion 19 substantially coincides with the front-rear direction of the vehicle 10. The near-infrared radiation IR1, IR2 penetrates through the cover main body portion 19 in the thickness direction. Besides a function as the cover of the near-infrared sensor 11, the near-infrared sensor cover 17 also has a function as a garnish that decorates a front portion of the vehicle 10.

A rear portion of the cover main body portion 19 in the thickness direction is constituted by a base member 21. The base member 21 is formed of a resin material such as acrylonitrile-ethylene-styrene copolymer (AES) resin.

A part in front of the base member 21 in the thickness direction of the cover main body portion 19 is constituted by a transparent member 22. The transparent member 22 is formed of polycarbonate (PC), which is a transparent resin material, and may also be formed of a transparent resin material such as polymethyl methacrylate (PMMA) and cycloolefin polymer (COP).

The transparent member 22 is formed with a hard coat layer 23 having a hardness higher than the transparent member 22 on a front surface. The hard coat layer 23 is formed on the front surface of the transparent member 22 by applying a known surface treatment agent to resin. Examples of the surface treatment agent include an organic hard coating agent of acrylate-based, oxetane-based, silicone-based, and the like, an inorganic hard coating agent, and an organic and inorganic hybrid hard coating agent.

A luster layer 24, a decorative layer 31, and a shielding layer 32 are laminated in order from front to rear between the transparent member 22 and the base member 21. In FIG. 3, thicknesses of the hard coat layer 23, the luster layer 24, the decorative layer 31, and the shielding layer 32 are exaggerated to their actual thicknesses for ease of understanding.

The luster layer 24 is used to exhibit a metallic luster (brilliant or lustering appearance) and is formed on a rear surface of the transparent member 22. In order to exhibit the brilliant or lustering appearance, it is necessary to reflect and scatter a large amount of visible light. In this respect, it is suitable to contain a metal filler such as aluminum in the luster layer 24. However, when a metal is contained in the luster layer 24, not only the visible light but also the near-infrared radiation IR1, IR2 is also reflected (not penetrate). Therefore, in the first embodiment, the luster layer 24 is formed with dispersed fillers 25 that reflect a part of visible light and transmit the near-infrared radiation IR1, IR2 in the coating film, so as to exhibit the lustering appearance without using a metal material.

Figure 4A:
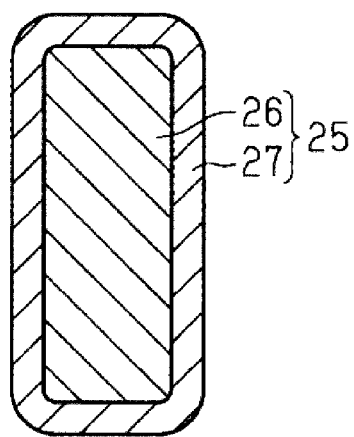
FIG. 4A is a cross-sectional view illustrating a schematic configuration of a filler in the first embodiment.
Figure 4B:
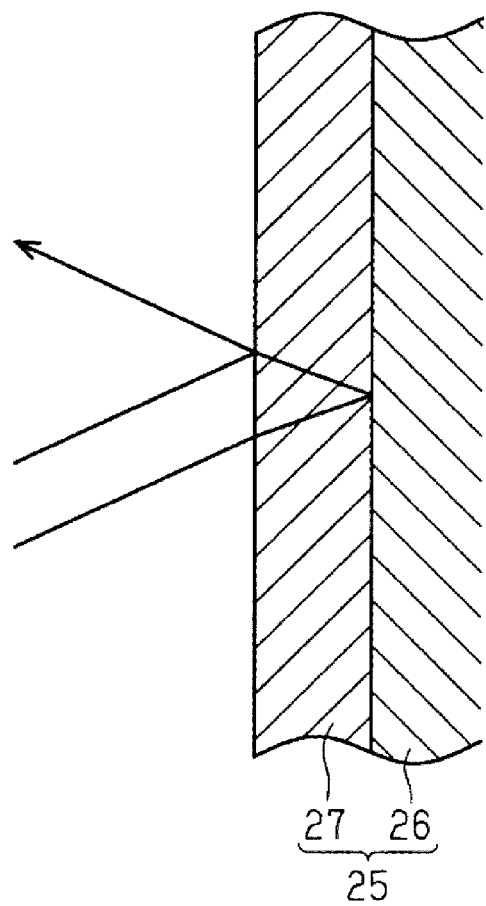
FIG. 4B is a partial enlarged cross-sectional view of FIG. 4A.

As illustrated in FIGS. 3, 4A, and 4B, the fillers 25 are formed by covering (coating) a core 26 with a shell (film) 27 having a refractive index different from that of the core 26. Both the core 26 and the shell 27 are formed of materials those transmit the near-infrared radiation IR1, IR2. In the first embodiment, each of the fillers 25 includes the core 26 formed of a low refractive index material and the shell 27 formed of a high refractive index material.

For example, the fillers 25 can be pearl mica in which the core 26 is formed of any one of aluminum oxide, titanium oxide, and the like, and the shell 27 is formed of a metal oxide such as tin oxide or zirconium oxide. Alternatively, the fillers 25 can also be glass fillers in which the core 26 is formed by silica (silicon dioxide) and the shell 27 is formed by a metal oxide such as titanium oxide.

As for the materials that form the core 26 and the shell 27, those having a large difference in refractive indexes are preferably selected. This is because more light is reflected as the difference in refractive indexes increases.

As a content of the fillers 25 in the luster layer 24 increases (concentration increases), light transmittance of the near-infrared radiation IR1, IR2 decreases. From a viewpoint of setting the light transmittance of the near-infrared radiation IR1, IR2 to 60% or more, the concentration of the fillers 25 is preferably 2% by weight (wt %) or less.

When the concentration of the fillers 25 in the luster layer 24 is constant, the light transmittance of the near-infrared radiation IR1, IR2 is different depending on a type of the fillers 25. When the glass fillers are used as the fillers 25, the light transmittance of the near-infrared radiation IR1, IR2 tends to be higher than that in a case of using the pearl mica.

As illustrated in FIG. 3, the decorative layer 31 is formed on a rear surface of the luster layer 24. The decorative layer 31 contains a pigment as a colorant. Additionally, a dye may be used as the colorant in place of or in addition to the pigment.

A color reflected by the luster layer 24 and the decorative layer 31 viewed from outside of the vehicle 10 fits a color of a design component around the near-infrared sensor cover 17 in the vehicle 10. The shielding layer 32 is formed between the decorative layer 31 and the substrate member 21. The shielding layer 32 mainly prevents members located in rear of the decorative layer 31 from being seen through the decorative layer 31 and is formed by applying a paint such as black or silver. A dye, a pigment, or both may be added to the paint for coloring. Generally, carbon, iron oxide, and the like are mixed in the shielding layer 32. In the first embodiment, however, no carbon, iron oxide, or the like is used due to absorption and scattering of infrared radiation.

Each of the base member 21, the transparent member 22, the hard coat layer 23, the luster layer 24, the decorative layer 31, and the shielding layer 32 which constitute the cover main body portion 19 is less likely to transmit visible light but easily transmits the near-infrared radiation IR1, IR2. The light transmittance of the near-infrared radiation IR1, IR2 in the near-infrared sensor cover 17 is 60% or more, and a light transmittance of visible light is 70% or less.

Next, operational effects of the first embodiment configured as above are described. When the near-infrared sensor cover 17 is irradiated with light from a light source (such as a sun or a lamp) outside the vehicle 10, so-called thin film interference occurs in the luster layer 24. That is, as indicated by an arrow in FIG. 4B, a part of the irradiated light is reflected on a surface of the shell 27. Another part of the light is refracted at the surface of the shell 27 and enters the same shell 27, and is reflected on a boundary of the shell 27 and the core 26 and exits out of the shell 27. These two kinds of light enhance each other (interfere with each other) when phases thereof are aligned, and only light of a specific color is enhanced. Which color of light is enhanced depends on a thickness of the shell 27. Therefore, by adjusting the thickness of the shell 27, it is possible to enhance light of a color (structural color) having a specific wavelength corresponding to the thickness.

When the near-infrared sensor cover 17 is irradiated with light from a light source as described above, a part of the light is reflected on the decorative layer 31 (see FIG. 3). Therefore, a color with metallic luster enhanced by the luster layer 24 as described above and a color of light reflected by the decorative layer 31 appear to be mixed with each other from outside of the vehicle 10.

The luster layer 24, the decorative layer 31, and the shielding layer 32 function to hide members disposed in rear of the near-infrared sensor cover 17 in the near-infrared sensor 11, such as the case 12, the transmitting unit 15, and the receiving unit 16. For this reason, the transmitting unit 15 and the receiving unit 16 located behind the sensor cover 17 are hardly seen when the near-infrared sensor cover 17 is viewed from outside of the vehicle 10. Therefore, an appearance (design) is improved as compared with a case where the transmitting unit 15 and the receiving unit 16 are seen through the near-infrared sensor cover 17.

Further, the color of light reflected and enhanced by the shell 27 and the core 26 of the luster layer 24 and the color of light reflected by the decorative layer 31 fit the color of the design component around the near-infrared sensor cover 17 in the vehicle 10. Accordingly, unity of the near-infrared sensor cover 17 with the design component is obtained, and the design is improved.

Particularly, in the first embodiment, a color of the near-infrared sensor cover 17 fits the color of the design component by means of the color of light reflected and enhanced by the decorative layer 31 in addition to the color of light reflected and enhanced by the shell 27 and the core 26. Therefore, color fitting is easier as compared with a case where the color of the near-infrared sensor cover 17 fits the color of the design component only by means of the color of light reflected and enhanced by the shell 27 and the core 26 in the luster layer 24.

When the design component has metallic luster, the metallic luster of the luster layer 24 further increases the unity with the design component, thereby further improving the design. Further, in the near-infrared sensor cover 17, the hard coat layer 23 formed on the front surface of the transparent member 22 improves impact resistance of the near-infrared sensor cover 17. Therefore, the front surface of the near-infrared sensor cover 17 can be prevented from damages due to flying stones and the like. The hard coat layer 23 also improves weather resistance of the near-infrared sensor cover 17. Therefore, the near-infrared sensor cover 17 can be prevented from oxidation or deterioration due to sunlight, rain, temperature changes, and the like.

As illustrated in FIGS. 2 and 3, the near-infrared radiation IR1 transmitted from the transmitting unit 15 penetrates through the cover main body portion 19 of the near-infrared sensor cover 17. The near-infrared radiation IR1 reaches and is reflected by an object including a preceding vehicle, a pedestrian, and the like. The reflected near-infrared radiation IR2 again penetrates through the cover main body portion 19 and is received by the receiving unit 16. The cover main body portion 19 hardly interferes with the transmission of the near-infrared radiation IR1, IR2 since the light transmittance of the near-infrared radiation IR1, IR2 in the cover main body portion 19 is 60% or more. An amount of near-infrared radiation IR1, IR2 attenuated by the cover main body portion 19 can be kept within an allowable range. Therefore, the near-infrared sensor 11 can appropriately perform a function of detecting a distance and a relative speed between the vehicle 10 and an object.

Second Embodiment

Figure 5:
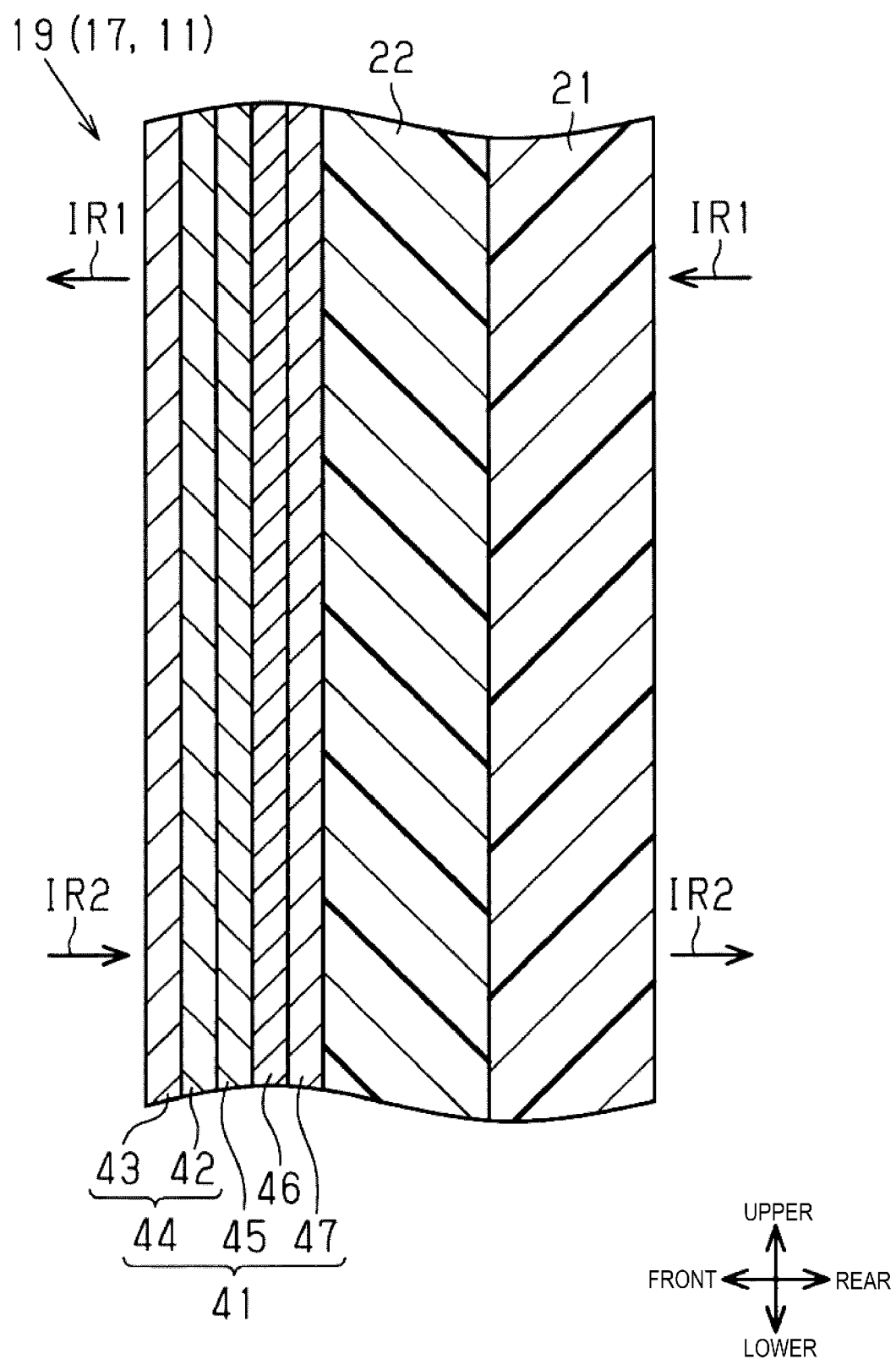
FIG. 5 illustrates a near-infrared sensor cover according to a second embodiment and is a partial enlarged side cross-sectional view of the cover main body portion corresponding to FIG. 3.

Next, the second embodiment of the near-infrared sensor cover 17 is described with reference to FIG. 5.

The near-infrared sensor cover 17 has a function as a cover of the near-infrared sensor 11 besides a function as a garnish that decorates a front portion of the vehicle 10, which is similar to the first embodiment. Further, the near-infrared sensor cover 17 includes the peripheral wall portion 18 and the cover main body portion 19, and the base member 21 constitutes a rear portion of the cover main body portion 19 in a thickness direction, which are also similar to the first embodiment.

In the second embodiment, the transparent member 22 is adjacent to a front side of the base member 21. The transparent member 22 and the base member 21 are curved so as to bulge forward. The transparent member 22 is provided with a film body 41 on a front surface. The film body 41 is deformed along the front surface of the transparent member 22 by vacuum molding, TOM molding, and the like.

A main portion of the film body 41 is constituted by a transparent film 42. The transparent film 42 is formed with a hard coat layer 43 on a front surface. In the second embodiment, a surface hardness improved film (product name: DFO2PU) manufactured by Mitsubishi Gas Chemical Company, Inc. is used as a laminated body 44 in which the hard coat layer 43 is formed on the front surface of the transparent film 42. The surface hardness improved film, which is also referred to as a hard coat film, has a high surface hardness, good thermal moldability, scratch resistance, weather resistance, and the like, and enables thermal molding.

A decorative layer 45, a luster layer 46, and a shielding layer 47 are laminated in this order on a rear surface of the transparent film 42. In FIG. 5, thicknesses of the hard coat layer 43, the decorative layer 45, the luster layer 46, and the shielding layer 47 are exaggerated to their actual thicknesses for ease of understanding.

The decorative layer 45 exhibits a color (color tone) such as red, blue, and yellow. In the second embodiment, decorative ink (product name: MIX-HF) manufactured by Teikoku Printing Inks Mfg. Co., Ltd. is used as the decorative layer 45.

The luster layer 46 exhibits metallic luster (brilliant or lustering appearance) without using a metal material. In the second embodiment, a resin film (product name: PICASUS) manufactured by Toray Industries, Inc. is used as the luster layer 46. The resin film is an organic optical multilayer film in which two kinds of polymer resin materials (low refractive index polymer and high refractive index polymer) having different refractive indexes are laminated in hundreds to thousands of layers. The luster layer 46 reflects visible light by interference reflection, thereby transmitting the near-infrared radiation IR1, IR2 while exhibiting a metallic tone.

The shielding layer 47 is formed of an infrared transmitting ink (IR ink) known as a material having a high light transmittance of the near-infrared radiation IR1, IR2 and a low light transmittance of visible light. In the second embodiment, a binder ink (product name: IMB-HF006) manufactured by Teikoku Printing Inks Mfg. Co., Ltd. is used as the shielding layer 47. The binder ink has a binder function in addition to a shielding function of causing the transparent member 22 difficult to be seen.

A color reflected by the decorative layer 45 and the luster layer 46 viewed from outside of the vehicle 10 fits a color of a design component around the near-infrared sensor cover 17 in the vehicle 10. The transparent film 42, the hard coat layer 43, the decorative layer 45, the luster layer 46, and the shielding layer 47 constitute the film body 41. The film body 41 is bonded to the transparent member 22 in the shielding layer 47.

Each of the base member 21, the transparent member 22, the hard coat layer 43, the transparent layer 42, the decorative layer 45, the luster layer 46, and the shielding layer 47 those constitute the cover main body portion 19 hardly transmits visible light but easily transmits the near-infrared radiation IR1, IR2. The light transmittance of the near-infrared radiation IR1, IR2 in the near-infrared sensor cover 17 is 60% or more, and a light transmittance of visible light is 70% or less.

The same elements as those described in the first embodiment are denoted by the same reference numerals, and repetitive descriptions thereof are omitted. Next, operational effects of the second embodiment configured as above are described.

When the near-infrared sensor cover 17 is irradiated with light from a light source (such as a sun or a lamp) outside the vehicle 10, a part of the light is reflected by the decorative layer 45. Further, so-called multilayer film interference occurs in the luster layer 46. That is, refraction, diffraction, and reflection (interference reflection) of light occur in a plurality of layers, and visible light is reflected, so that a color with metallic luster is enhanced. Light of a color having a specific wavelength can be enhanced by rearranging film thicknesses, the number of layers, arrangement of the layers, and the like.

Therefore, a color of light reflected by the decorative layer 45 and a color with metallic luster enhanced by the luster layer 46 appear to be mixed with each other from the outside of the vehicle 10. The decorative layer 45, the luster layer 46, and the shielding layer 47 function to hide the case 12, the transmitting unit 15, the receiving unit 16, and the like which are members in rear thereof. For this reason, the transmitting unit 15 and the receiving unit 16 located behind the sensor cover 17 are hardly seen when the near-infrared sensor cover 17 is viewed from outside of the vehicle 10. Therefore, an appearance (design) is improved as compared with a case where the transmitting unit 15 and the receiving unit 16 are seen through the near-infrared sensor cover 17.

Further, the color of light reflected by the decorative layer 45 and the color of light with metallic luster enhanced by the luster layer 46 fit the color of the design component around the near-infrared sensor cover 17 in the vehicle 10. Accordingly, unity of the near-infrared sensor cover 17 with the design component is obtained, so that the design is improved.

Particularly, in the second embodiment, a color of the near-infrared sensor cover 17 fits the color of the design component by means of the color of light reflected by the decorative layer 45 in addition to the color of light enhanced by the luster layer 46. Therefore, color fitting is easier as compared with a case where the color of the near-infrared sensor cover 17 fits the color of the design component only by means of the color of light enhanced by the luster layer 46.

When the design component has metallic luster, the metallic luster of the luster layer 46 further increases the unity with the design component, thereby further improving the design. Further, in the near-infrared sensor cover 17, the hard coat layer 43 formed on the front surface of the transparent member 22 improves impact resistance and weather resistance of the near-infrared sensor cover 17.

Also in the second embodiment, the near-infrared radiation IR1 from the transmitting unit 15 penetrates through the cover main body portion 19. The near-infrared radiation IR1, after reaching and being reflected by the object, penetrates through the cover main body 19 again, and is received by the receiving unit 16. The cover main body portion 19 hardly interferes with the transmission of the near-infrared radiation IR1, IR2 since the light transmittance of the near-infrared radiation IR1, IR2 in the cover main body portion 19 is 60% or more. An amount of near-infrared radiation IR1, IR2 attenuated by the cover main body portion 19 can be kept within an allowable range. Therefore, according to the second embodiment, the near-infrared sensor 11 can also appropriately perform a function of detecting a distance and a relative speed between the vehicle 10 and an object.

According to the second embodiment, the following effects can be obtained in addition to the above. The film body 41, in which the laminated body 44 is decorated by laminating the decorative layer 45, the luster layer 46, the shielding layer 47, and the like, is bent along the curved shape of the transparent member 22 by vacuum molding, TOM molding, and the like. Therefore, the film body 41 has good shape followability and is applicable even to the curved transparent member 22.

As a method of integrating the film body 41 and the transparent member 22, a film insert method including film processing and injection molding may be adopted. The film insert molding is a mode of a resin molding method in which the film body 41 and a resin material are integrated by placing the film body 41 in a mold, pressurizing and pouring the resin material in a molten state into the mold, and cooling and solidifying the resin material.

The luster layer 46 is formed of a resin film, and is accordingly easily bent compared to a case of being formed of an inorganic material. Therefore, it is easy to deform the luster layer 46 along the curved shape of the transparent member 22.

The above embodiments can also be implemented as modifications modified as follows.

Related to First Embodiment

A positional relationship of the luster layer 24 and the decorative layer 31 may be reversed. That is, the decorative layer 31 may be formed on a rear surface of the transparent member 22, and the luster layer 24 may be formed on a rear surface of the decorative layer 31. The same effects as those in the first embodiment are also obtained in this case.

As for the fillers 25, a material including the core 26 formed of a high refractive index material and the shell 27 formed of a low refractive index material may also be used.

The decorative layer 31 may be omitted. In this way, a color of the near-infrared sensor 11 viewed from outside of the vehicle 10 is determined by the color of light reflected and enhanced by interference by the luster layer 24. By adjusting the thickness of the shell 27, it is possible to enhance light of a specific color having a wavelength corresponding to the thickness. From outside of the vehicle 10, the reflected light appears brilliant like a metal (with metallic luster) with a specific color.

Further, the color of light reflected and enhanced by the shell 27 and the core 26 fits the color of the design component around the near-infrared sensor cover 17 in the vehicle 10. Accordingly, unity of the near-infrared sensor cover 17 with the design component is obtained, and the design is improved.

When the design component has metallic luster, the metallic luster of the luster layer 46 further increases the unity with the design component, thereby further improving the design.

Related to Second Embodiment

The luster layer 46 in the second embodiment may be changed into the same configuration as that of the luster layer 24 in the first embodiment.

Commonly Related to First and Second Embodiments

A water-repellent layer may be formed on front surfaces of the hard coat layers 23, 43. The water-repellent layer is formed of an organic coating film, a silicone film, and the like. The water-repellent layer repels water adhering to the front surface of the near-infrared sensor cover 17, making the near-infrared sensor cover 17 difficult to wet. Accordingly, it is possible to prevent a film of water on the front surface of the near-infrared sensor cover 17.

Figure 6:
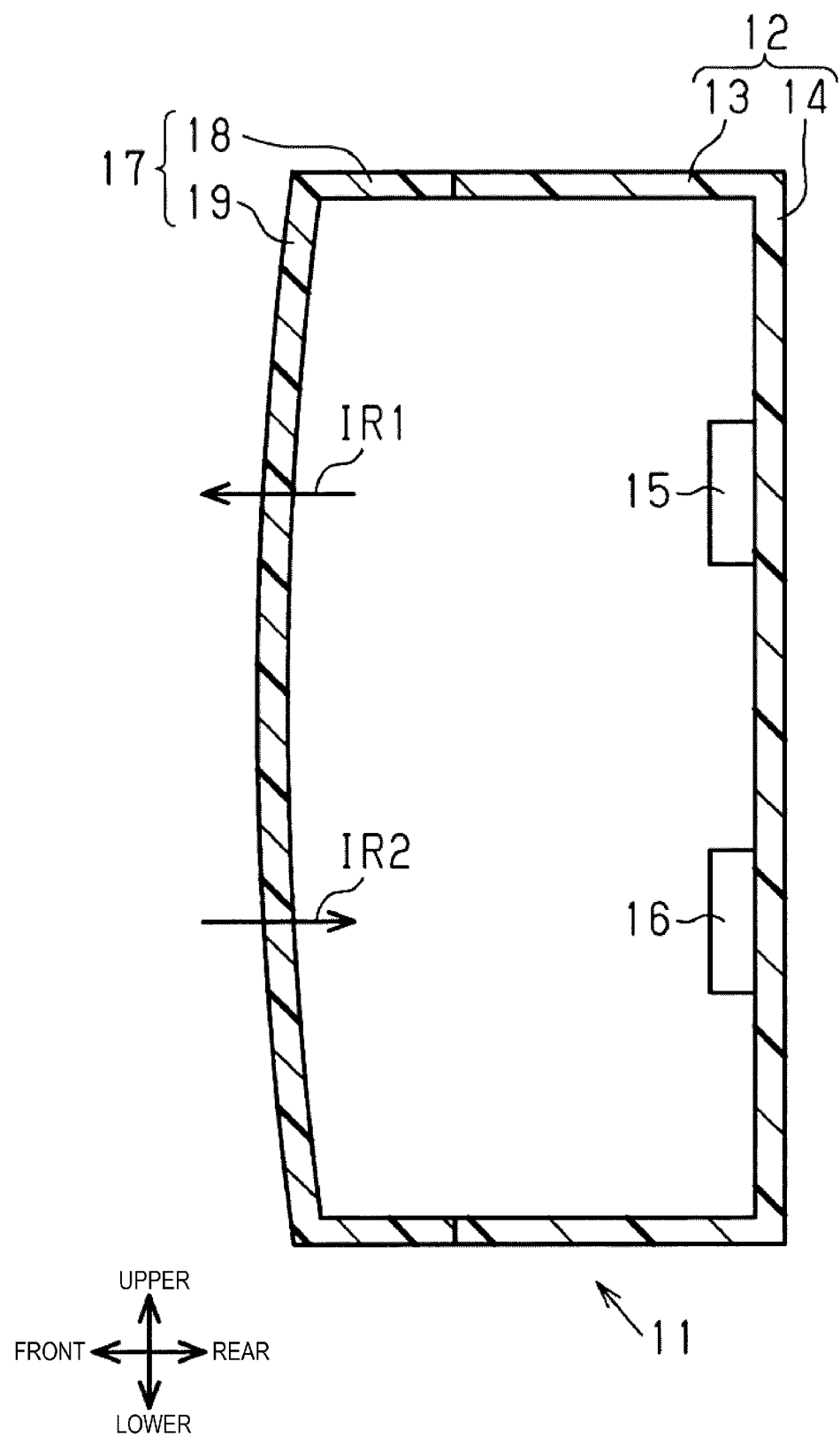
FIG. 6 is a side cross-sectional view illustrating a near-infrared sensor including a near-infrared sensor cover according to a modification.

The hard coat layers 23, 43 may have a water repellent function. Unlike the first and the second embodiments, the function as a garnish that decorates the front portion of the vehicle 10 may be omitted from the near-infrared sensor cover 17. In this case, as illustrated in FIG. 6, the near-infrared sensor cover 17 includes the tubular peripheral wall portion 18 and the plate-shaped cover main body portion 19 at a front end portion of the peripheral wall portion 18, which is similar to the first and second embodiments. However, the cover main body portion 19 has a size smaller than that of the cover main body portion 19 in the first and second embodiments, and more specifically, a size small enough for blocking a front end opening of the peripheral wall portion 13. Further, the near-infrared sensor cover 17 in a modification in FIG. 6 does not include the base member 21. A layer structure of the cover main body portion 19 is the same as that in the first or second embodiment. Therefore, the same operational effects as those in the first or the second embodiment are also obtained in this case.

The near-infrared sensor cover 17 constitutes a part of the near-infrared sensor 11 in the first embodiment, the second embodiment, and the modification in FIG. 6. However, as illustrated in FIG. 7, the near-infrared sensor cover 17 may also be provided separately from the near-infrared sensor 11.

That is, the near-infrared sensor 11 includes the case 12 in which the transmitting unit 15 and the receiving unit 16 are assembled, and a cover 51 that is disposed in front of the case 12 and covers the transmitting unit 15 and the receiving unit 16.

Figure 7:
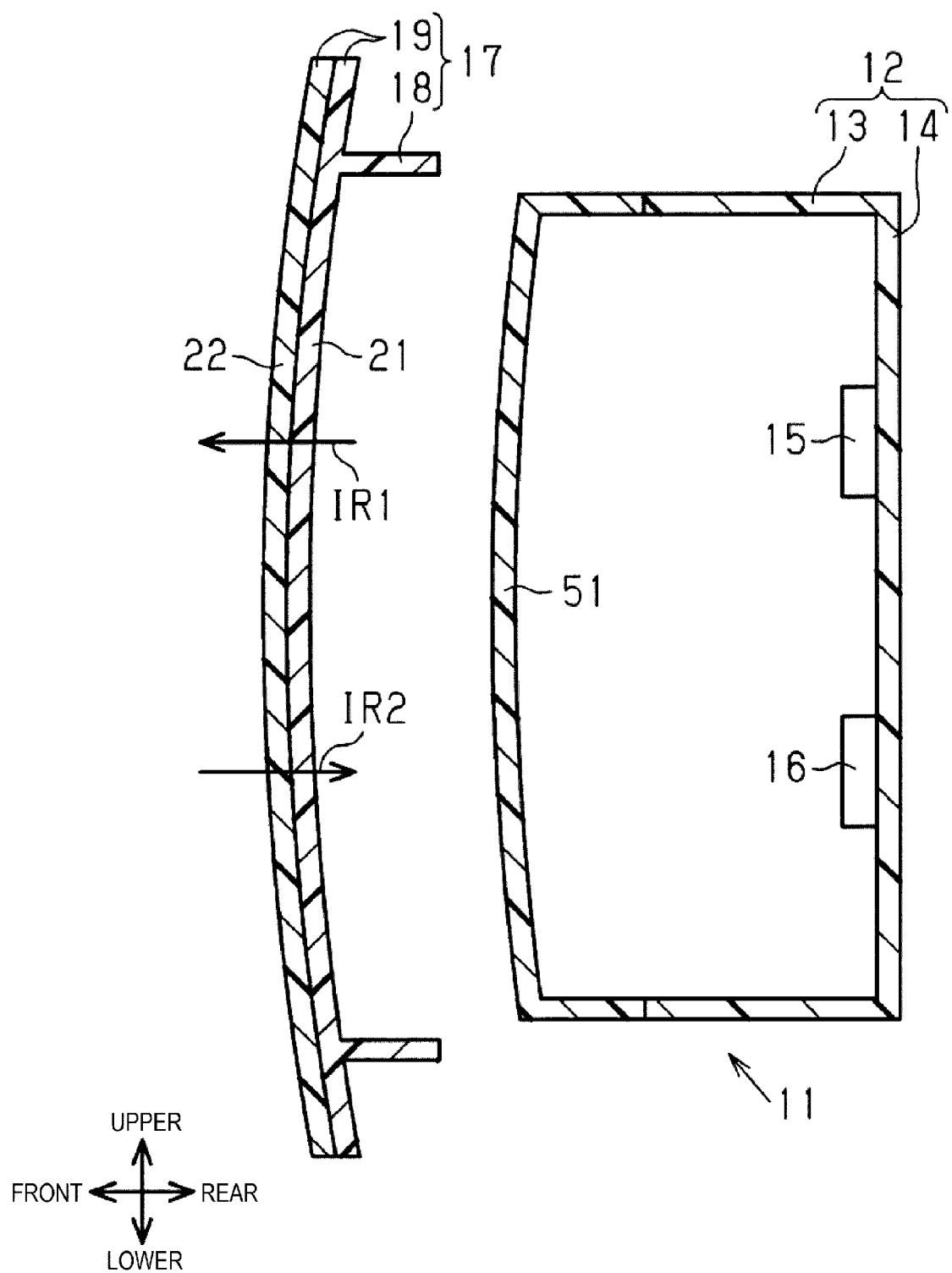
FIG. 7 is a side cross-sectional view illustrating a near-infrared sensor cover according to a modification, which is provided separately from a near-infrared sensor, together with the near-infrared sensor.

In a modification in FIG. 7, the near-infrared sensor cover 17 having the same configuration as that in the first or the second embodiment is disposed in front of the cover 51 of the near-infrared sensor 11. In this case, the near-infrared sensor cover 17 is fixed to a body of the vehicle 10 separately from the near-infrared sensor 11. The same operational effects as those in the first or the second embodiment are also obtained in this case.

The invention claimed is:

1. A near-infrared sensor cover to be applied to a near-infrared sensor including a transmitter configured to transmit near-infrared radiation to outside of a vehicle and a receiver configured to receive near-infrared radiation reaching and reflected by an object outside the vehicle and to cover the transmitter and the receiver, wherein
the near-infrared sensor cover comprises a luster layer formed by dispersing a filler in a coating film,
the filler includes a core and a shell that covers the core with a material having a refractive index different from that of the core,
light transmittance of near-infrared radiation in the near-infrared sensor cover is 60% or more, and
the filler is made of pearl mica in which the core is formed of aluminum oxide or titanium oxide and the shell is formed of tin oxide or zirconium oxide.

2. The near-infrared sensor cover according to claim 1, further comprising a decorative layer including a coating film containing at least one of a pigment and a dye as a colorant.

3. A near-infrared sensor cover to be applied to a near-infrared sensor including a transmitter configured to transmit near-infrared radiation to outside of a vehicle and a receiver configured to receive near-infrared radiation reaching and reflected by an object outside the vehicle and to cover the transmitter and the receiver, wherein
the near-infrared sensor cover comprises a luster layer formed by dispersing a filler in a coating film,
the filler includes a core and a shell that covers the core with a material having a refractive index different from that of the core,
light transmittance of near-infrared radiation in the near-infrared sensor cover is 60% or more, and
the filler is made of a glass filler in which the core is formed of silicon dioxide and the shell is formed of titanium oxide.

4. The near-infrared sensor cover according to claim 3, further comprising a decorative layer including a coating film containing at least one of a pigment and a dye as a colorant.

* * * * *